(12) United States Patent
Creech et al.

(10) Patent No.: US 11,142,067 B2
(45) Date of Patent: Oct. 12, 2021

(54) DIFFERENTIAL SENSOR APPARATUS AND METHOD OF USE

(71) Applicant: DANA AUTOMOTIVE SYSTEMS GROUP, LLC, Maumee, OH (US)

(72) Inventors: Michael Z. Creech, Ann Arbor, MI (US); Justin S. Davis, Maumee, OH (US); Anne M. Adamczyk, Grand Rapids, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 62 days.

(21) Appl. No.: 16/611,535

(22) PCT Filed: May 9, 2018

(86) PCT No.: PCT/US2018/031830
§ 371 (c)(1),
(2) Date: Nov. 7, 2019

(87) PCT Pub. No.: WO2018/208937
PCT Pub. Date: Nov. 15, 2018

(65) Prior Publication Data
US 2020/0094676 A1    Mar. 26, 2020

Related U.S. Application Data

(60) Provisional application No. 62/503,667, filed on May 9, 2017.

(51) Int. Cl.
*F16H 48/34* (2012.01)
*B60K 23/04* (2006.01)
*F16H 48/20* (2012.01)

(52) U.S. Cl.
CPC ............ *B60K 23/04* (2013.01); *F16H 48/34* (2013.01); *B60K 2023/046* (2013.01); *F16H 2048/204* (2013.01)

(58) Field of Classification Search
CPC ... B60K 23/04; B60K 2023/046; F16H 48/34; F16H 2048/346; F16H 2048/204
See application file for complete search history.

(56) References Cited

U.S. PATENT DOCUMENTS

| 4,683,775 A | 8/1987 | Hilker |
| 4,781,078 A | 11/1988 | Blessing |

(Continued)

FOREIGN PATENT DOCUMENTS

| EP | 1568917 | 8/2005 |
| GB | 2520369 | 5/2015 |

(Continued)

OTHER PUBLICATIONS

European Patent Office, International Search Report with Written Opinion in application PCT/US2018/031830, dated Aug. 31, 2018, 12 pages, Rijswijk Netherlands.

*Primary Examiner* — Edwin A Young
(74) *Attorney, Agent, or Firm* — McCoy Russell LLP (57) ABSTRACT

An axle assembly including a differential case and a side gear having an inboard surface and an outboard surface disposed in the differential case. The side gear outboard surface defines a first plurality of locking teeth. A locking gear having an inboard surface and an outboard surface, wherein the inboard surface includes a second plurality of locking teeth selectively engaged with the first plurality of locking teeth. A biasing member disposed axially between the side gear and the locking gear. An electromagnetic coil disposed adjacent the locking gear. A first inductive sensor for sensing a position of the locking gear.

20 Claims, 4 Drawing Sheets

(56) References Cited

U.S. PATENT DOCUMENTS

| | | |
|---|---|---|
| 5,005,663 A | 4/1991 | Niide |
| 5,058,718 A | 10/1991 | Tojima |
| 5,157,966 A | 10/1992 | Lugosi |
| 5,265,707 A | 11/1993 | Abe |
| 5,947,246 A | 9/1999 | Koller |
| 6,098,774 A | 8/2000 | Herzig |
| 7,211,020 B2 | 5/2007 | Gohl |
| 7,247,118 B2 | 7/2007 | Haruki |
| 7,264,568 B2 | 9/2007 | Ludwig |
| 7,294,085 B2 | 11/2007 | Pistagnesi |
| 7,357,749 B2 | 4/2008 | Nofzinger |
| 7,384,359 B2 | 6/2008 | Pinkos |
| 7,425,185 B2 | 9/2008 | Donofrio |
| 7,507,176 B2 | 3/2009 | Pinkos |
| 7,534,187 B2 | 5/2009 | Donofrio |
| 7,602,271 B2 | 10/2009 | York |
| 7,682,279 B2 | 3/2010 | Donofrio |
| 7,764,154 B2 | 7/2010 | York |
| 7,785,224 B2 | 8/2010 | York |
| 7,837,585 B2 | 11/2010 | Pinkos |
| 7,876,186 B2 | 1/2011 | York |
| 7,878,314 B2 | 2/2011 | Pinkos |
| 7,942,780 B2 | 5/2011 | Donofrio |
| 7,973,635 B2 * | 7/2011 | Baarman ............... H05K 1/165 336/222 |
| 8,050,829 B2 | 11/2011 | Johnson |
| 8,057,345 B2 | 11/2011 | Pinkos |
| 8,109,358 B2 | 2/2012 | Dayton |
| 9,333,965 B2 | 5/2016 | Marsh |
| 9,500,268 B2 | 11/2016 | Balenda, II |
| 9,556,945 B2 | 1/2017 | Fox |
| 9,625,026 B2 * | 4/2017 | Cochren ............... F16H 48/08 |
| 2005/0279607 A1 | 12/2005 | Fusegi |
| 2010/0298083 A1 * | 11/2010 | Dayton ............... F16H 48/30 475/150 |
| 2014/0004988 A1 * | 1/2014 | Yamanaka ........... F16H 48/22 475/231 |
| 2015/0204431 A1 | 7/2015 | Cochren |
| 2016/0319925 A9 | 11/2016 | Cochren |
| 2017/0074380 A1 | 3/2017 | Raghavan |
| 2017/0219023 A1 * | 8/2017 | Haupt ................. F16D 27/108 |

FOREIGN PATENT DOCUMENTS

| | | |
|---|---|---|
| JP | H02286944 | 11/1990 |
| JP | 2006046594 | 2/2006 |
| WO | 2010141367 | 12/2010 |
| WO | 2017027347 | 2/2017 |

* cited by examiner

DIFFERENTIAL SENSOR APPARATUS AND METHOD OF USE

RELATED APPLICATION

The present application claims the benefit of U.S. Provisional Patent Application No. 62/503,667 filed on May 9, 2017, which is fully incorporated by reference herein.

BACKGROUND

The present disclosure relates to an axle assembly and a torque conveyance sensor apparatus. Axle assemblies in wheeled vehicle drivetrains are known to employ a differential apparatus to transmit torque from a power source to the vehicle wheels. The differential apparatus permits an outer drive wheel to rotate at a greater velocity than an inner drive wheel when operating a vehicle through a turn, and the differential apparatus divides the power between the connected vehicle wheels.

A limited-slip or locking differential apparatus may be utilized to provide a wheel having better traction with more driving force. Reliably determining the position of a differential apparatus locking gear is challenged by the rotating and non-rotating components of the differential apparatus as well as the wear created thereby.

In view of the challenges and disadvantages of conventional designs, the present disclosure provides for a non-contact type sensor apparatus providing reduced cost, weight, and complexity.

SUMMARY

The present disclosure provides for an axle assembly including a differential case. A side gear having an inboard surface and an outboard surface is disposed in the differential case. The side gear outboard surface defines a first plurality of locking teeth. The axle assembly also includes a locking gear having an inboard surface and an outboard surface, wherein the inboard surface includes a second plurality of locking teeth. The second plurality of locking teeth of the locking gear are selectively engaged with the side gear first plurality of locking teeth. Further, a biasing member is disposed axially between the side gear and the locking gear. The axle assembly additionally includes, an electromagnetic coil disposed adjacent the locking gear, and a first inductive sensor for sensing a position of the locking gear.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION OF EMBODIMENTS

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Locking differentials are utilized in applications across multiple industries including automotive, aerospace, industrial automation equipment, and instrumentation applications. In one embodiment, the subject matter disclosed herein may be utilized in the operation of an all-wheel drive vehicle.

Figure 4:
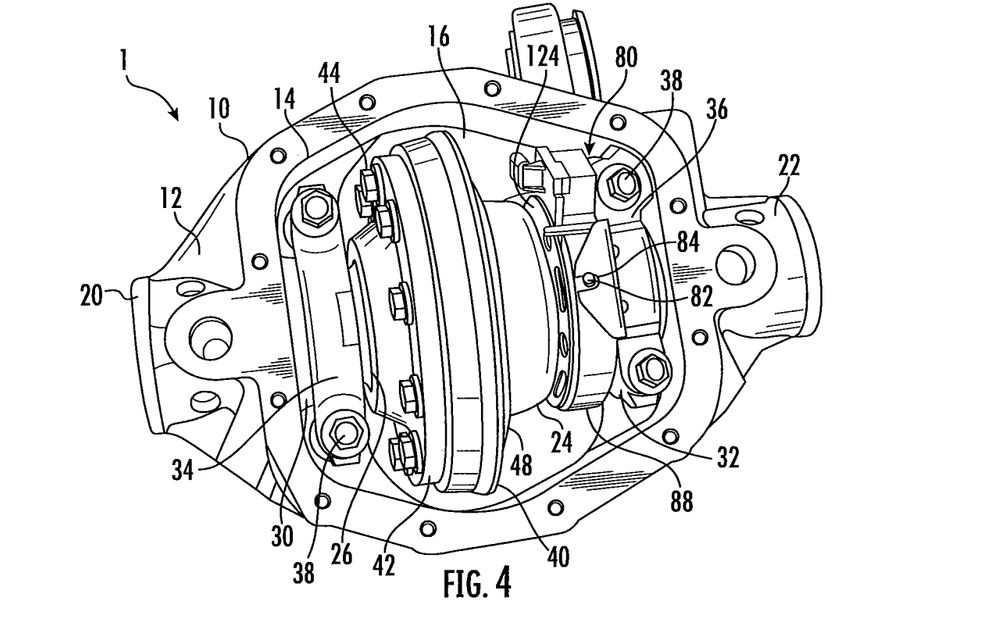
FIG. 4 illustrates a portion of an axle assembly according to an embodiment of the presently disclosed subject matter.

As illustrated in FIG. 4, in an embodiment, an axle assembly 1 may include a differential carrier 10. In an embodiment, the differential carrier 10 may be a one-piece metal housing. The differential carrier 10 includes an exterior surface 12 and an interior surface 14. The differential carrier interior surface 14 defines a hollow interior 16. The differential carrier 10 also includes a first axle flange 20 and a second axle flange 22. The first and second axle flanges 20, 22 are disposed opposite one another on the differential carrier 10. Axle tubes (not depicted) may be coupled with the first and second axle flanges 20, 22 for housing axle half shafts (not depicted).

The differential carrier 10 is coupled with a structural member (not shown) of a vehicle in which it is located. The differential carrier 10 is fixed in position and does not rotate.

As illustrated in FIGS. 1-4, the axle assembly 1 includes a differential mechanism comprising a differential case 24 disposed within the differential carrier hollow interior 16. The differential case 24 is mounted for rotation within the differential carrier 10 via a pair of bearings (not depicted). Differential case first and second flanges 26, 28 may be located within first and second differential bearing blocks 30, 32. First and second bearing straps 34, 36 may be located over the differential case first and second flanges 26, 28. The first and second bearing straps 34, 36 are connected to the first and second differential bearing blocks 30, 32, such as with mechanical fasteners 38. As illustrated in FIG. 4, the mechanical fasteners 38 may comprise bolts that extend through the first and second bearing straps 34, 36 and into the first and second differential bearing blocks 30, 32.

Figure 1:
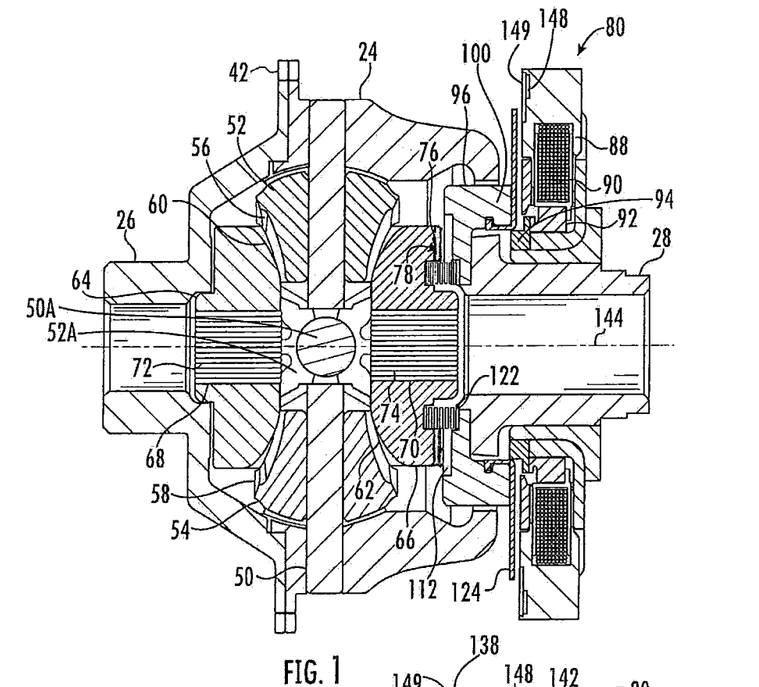
FIG. 1 illustrates a cross-section of a portion of a differential mechanism according to an embodiment of the presently disclosed subject matter.

As illustrated in FIG. 4, a ring gear 40 may be coupled with the differential case 24. In an embodiment, the ring gear 40 may be integrally formed with the differential case 24. In another embodiment, as illustrated in FIGS. 1 and 4, the differential case 24 may include a ring gear flange 42. The ring gear flange 42 may define a plurality of fastener apertures (not shown) disposed circumferentially thereabout and formed therethough. Mechanical fasteners 44, such as bolts, may be disposed through the fastener apertures and into a first side of the ring gear 40 to couple the differential case 24 and the ring gear 40.

The ring gear 40 includes a plurality of teeth (not depicted) on a second side 48 of the ring gear 40. The ring gear teeth extend continuously circumferentially about the second side 48. The ring gear teeth mesh with a set of teeth on a pinion gear (not depicted). The pinion gear is coupled with a driveshaft (not depicted). The driveshaft receives torque from a source of rotational power such as a transmission, engine and/or transfer case.

As illustrated in FIG. 1, in an embodiment, a pinion shaft 50 is disposed within the differential case 24. In an embodiment, additional pinion shafts 50A may be located at 90 degrees and transverse to the pinion shaft 50. The pinion shafts 50, 50A may also be referred to as spider shafts. The pinion shaft 50 is connected to the differential case 24. In an embodiment, the pinion shaft 50 may extend into the differential case 24 so that it is fixed therewith. Thus, the pinion shaft 50 rotates with the differential case 24.

A first differential pinion gear 52 is located on one end of the pinion shaft 50 and a second differential pinion gear 54 is located on the other end of the pinion shaft 50. The first and second differential pinion gears 52, 54 each include a plurality of teeth 56, 58 extending circumferentially about the first and second differential pinion gears 52, 54. As noted above, if additional pinion shafts 50A are provided, additional differential pinions may be located thereon. As illustrated in FIG. 1, a third differential pinion gear 52A is disposed on the additional pinion shaft 50A.

The teeth 56, 58 of the first and second differential pinion gears 52, 54 are meshed with teeth 60, 62 on a first differential side gear 64 and a second differential side gear 66. The differential side gear teeth 60, 62 extend circumferentially about the first and second differential side gears 64, 66.

The first and second differential side gears 64, 66 include a hollow interior portion 68, 70, respectively. The hollow interior portions 68, 70 may each include radially extending splines 72, 74. The splines 72 of the first differential side gear 64 may be engaged with splines on a first axle half shaft (not depicted) to transfer rotation to the shaft. The splines 74 of the second differential side gear 66 may be engaged with splines on a second axle half shaft (not depicted) to transfer rotation to the shaft. The first and second axle half shafts extend from the differential case 24 and through the differential carrier first and second axle flanges 20, 22 to wheel ends (not depicted).

As illustrated in FIGS. 1-3 and 5, the second differential side gear 66 may include a set of locking teeth 76 disposed on an axially outboard surface 78. In an embodiment, the locking teeth 76 are integrally formed with the second differential side gear 66. The locking teeth 76 extend circumferentially about the axially outboard surface 78.

As illustrated in FIGS. 1-5, an actuator assembly 80 may be mounted on the second differential case flange 28. The actuator assembly 80 is coupled with the differential carrier 10 so that the actuator assembly 80 is fixed against rotation relative to the differential carrier 10. In an embodiment, the actuator assembly 80 includes at least one radially extending pin 82. The pin 82 is received within a slotted flange 84 fixedly connected to the differential carrier 10. Receipt of the pin 82 within the slotted flange 84 prevents the actuator assembly 80 from rotating with the differential case 24.

In an embodiment, the actuator assembly 80 comprises a solenoid actuator. The actuator assembly 80 may include a housing 88, an electromagnetic coil 90, and an armature 92. In an embodiment, the housing 88 may have an annular geometry such that an inner diameter of the housing 88 is coupled with a sleeve 89. The sleeve 89 may be coupled with the differential case flange 28 such that the sleeve 89 may rotate relative to the differential case 24.

The electromagnetic coil 90 may be molded, or set, within a resin and disposed within the housing 88. The electromagnetic coil 90 may comprise a ring-shape with a hollow interior. The electromagnetic coil 90 is in electrical connection with a power source (not depicted), such as, but not limited to, a battery, that can selectively supply electricity to the electromagnetic coil 90. The power source may also be connected with a controller (not shown) that determines when electricity is supplied to the electromagnetic coil 90. In an embodiment, the controller may be mounted to an inboard portion of the actuator housing 88. In another embodiment, the controller may be mounted to a radially outer surface of the actuator housing 88. In still another embodiment, the controller may be mounted to an outboard surface of the actuator housing 88.

Figure 2:
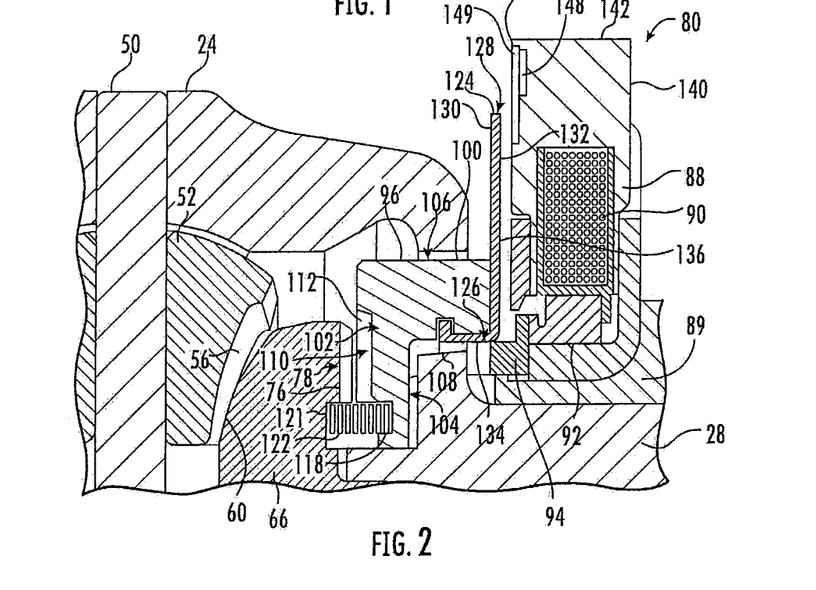
FIG. 2 illustrates a cross-section of a portion of the differential mechanism according to FIG. 1 in an unlocked state.
Figure 3:
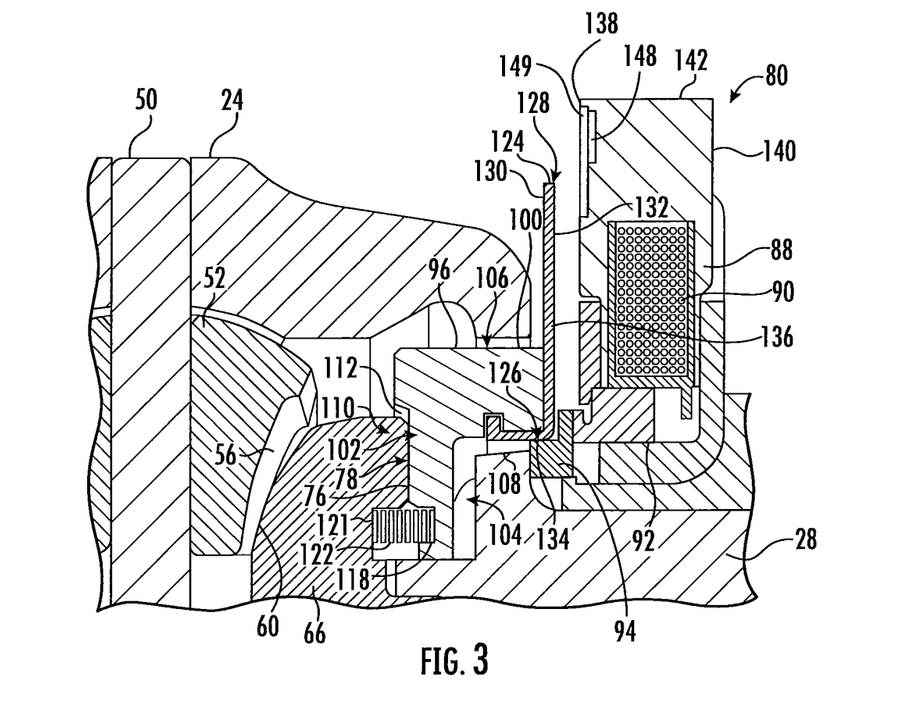
FIG. 3 illustrates a cross-section of a portion of the differential mechanism according to FIG. 1 in a locked state.

With reference to FIGS. 1-3, in an embodiment, the armature 92 may comprise a generally hollow-cylinder disposed radially inward from the electromagnetic coil 90. In some embodiments, at least a portion of the armature 92 is continuously radially surrounded by the electromagnetic coil 90. The armature 92 comprises a ferromagnetic material. Disposed axially adjacent to the armature 92, on an inboard side thereof, is an annular spacer 94. The annular spacer 94 may be comprised of a polymeric material.

When electricity is applied to the electromagnetic coil 90, the electromagnetic coil 90 generates a magnetic flux which extends through the housing 88 and the armature 92. The magnetic flux extends into the armature 92 causing the armature 92 to move in the axial direction. In an embodiment, the armature 92 does not rotate.

Figure 5:
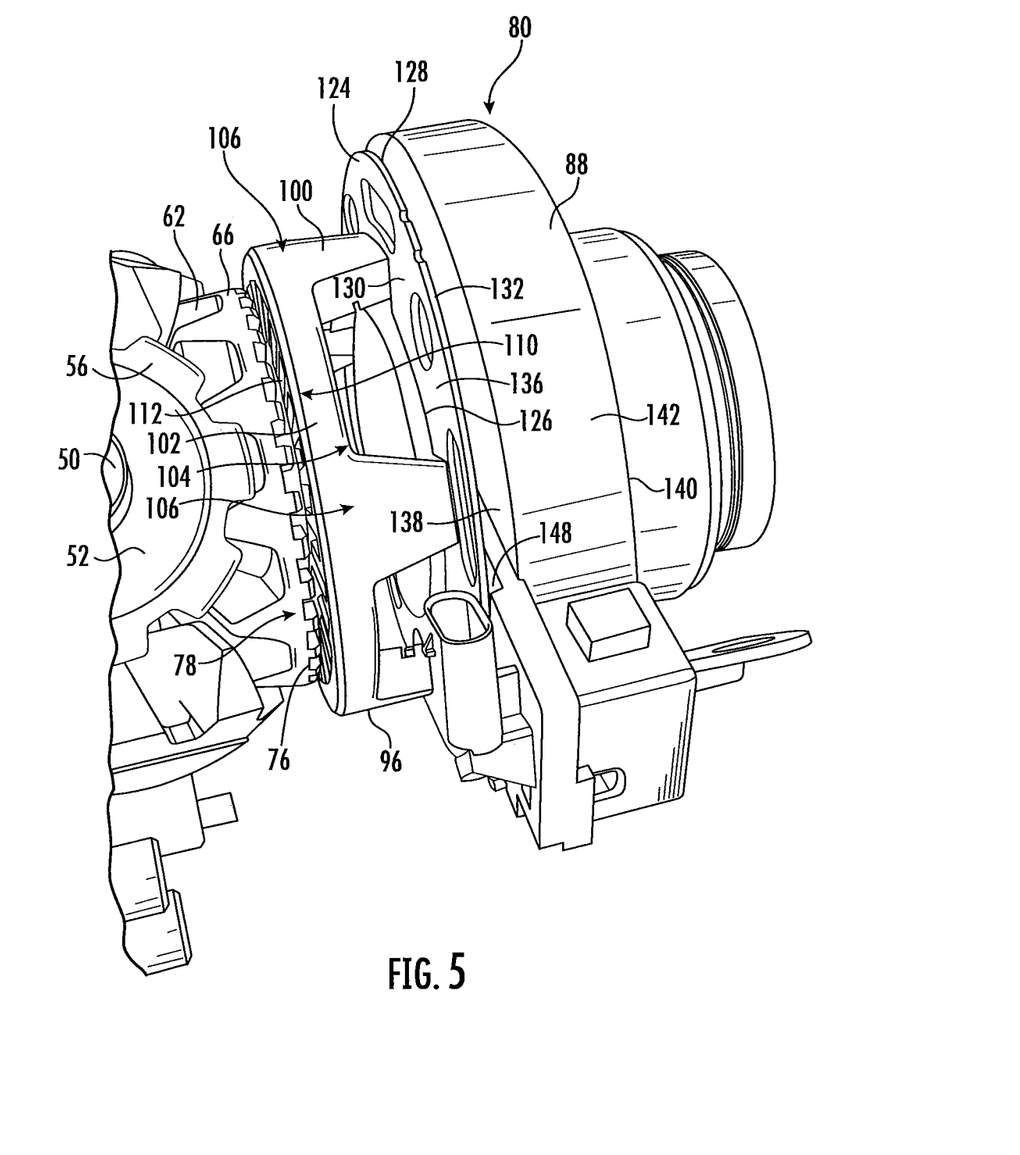
FIG. 5 illustrates a portion of the differential mechanism according to FIG. 1.

In an embodiment, as illustrated in FIGS. 1-3, a sensor plate 124 may be positioned axially adjacent to an inboard side of the spacer 94. The sensor plate 124 may also be disposed at least partially radially about the spacer 94. In an embodiment, the sensor plate 124 abuts a plurality of legs 100 of a locking gear 96. As illustrated in FIG. 5, the locking gear legs 100 extend axially outboard from a generally disk-shaped body portion 102 of the locking gear 96. The legs 100 are located on an axially outboard side 104 of the body portion 102. The locking gear body portion 102 includes a radially outer surface 106. The radially outermost surfaces of the legs 100 may extend from the outer surface 106 such that the outer surface 106 and the radially outermost surfaces of the legs 100 have the same outer diameter.

In an embodiment, the legs 100 may be circumferentially located such that they are separated from one another by arcs of the same length. The legs 100 may taper down from the body portion 102 to their ends. In an embodiment, the locking gear body portion 102 may be entirely located within the differential case 24. The locking gear legs 100 may be located mostly within the differential case 24; however, the end portions of the legs 100 axially extend through differential case apertures 108 dedicated to each leg 100. The end portions of the legs 100 extend outside of the differential case 24 to contact the armature 92, the spacer 94, or the sensor plate 98.

A plurality of teeth 112 are located on the axially inboard side 110 of the locking gear body portion 102. The teeth 112 extend circumferentially about the locking gear body portion inboard side 110. The locking gear teeth 112 are complementary with and selectively mesh with the second differential side gear locking teeth 76.

In an embodiment, the locking gear 96 defines an annular groove 118 located in an inboard surface thereof. The locking gear groove 118 may be axially aligned with a groove 121 on the axially outboard surface 78 of the second differential side gear 66. A biasing member 122 may be at least partially located within the locking gear groove 118 and the second differential side gear groove 121. The biasing member 122 axially biases the locking gear 96 apart from the second differential side gear 66 when the actuator assembly 80 is in a disengaged position. The biasing member 122 may be, but is not limited to, a spring, a plurality of springs, one or more Bellville-type washers, or one or more wave springs.

Being located within the differential case 24, it can be appreciated that the locking gear 96 rotates with the differential case 24. The locking gear 96 is preferably one piece, unitary and integrally formed out of a robust material, such as metal. The locking gear 96 may be constructed of a conductive material.

In an embodiment, as illustrated in FIGS. 1-3, the sensor plate 124 may be coupled with the locking gear 96. The sensor plate 124 may comprise a generally discoid geometry and have a radially inner surface 126, a radially outer surface 128, an axially inboard surface 130, and an axially outboard surface 132. The axially inboard and outboard surfaces 130, 132 may be parallel one another and equally spaced from one another. In the embodiment illustrated in FIGS. 1-3, the axially inboard and outboard surfaces 130, 132 define a substantially constant sensor plate 124 thickness therebetween. The sensor plate 124 may have a radial dimension much greater than its axial dimension. In other words, the thickness of the plate 124 may be much less than the distance between the radially inner and outer surface 126, 128.

As illustrated in FIGS. 1-3, the sensor plate 124 may comprise tabs 134 extending axially, or transverse, to the axially inboard surface 130. A radially inner surface of the tabs 134 may be contiguous with the sensor plate radially inner surface 126. The tabs 134 may be regularly spaced from one another about the circumference of the radially inner surface 126. In an embodiment, a portion of the tabs 134 may be disposed in a radially extending annular groove 135 defined by the locking gear 96 to frictionally lock the sensor plate 124 to the locking gear 96. In one embodiment, the groove 135 is disposed in a radially inner side of the locking gear legs 100.

At least a portion of the sensor plate 124 is located substantially outside of the differential case 24; however, the sensor plate tabs 134 may extend into the differential case 24. More particularly, the tabs 134 may extend at least partially through the differential case apertures 108. In other embodiments (not depicted), the sensor plate 124 may be coupled with the locking gear 96 in other ways such as, but not limited to, mechanical fasteners. Thus, in certain embodiments, the armature 92 or the annular spacer 94 may not directly contact the sensor plate 124, but instead the armature 92 or annular spacer 94 may directly contact the locking gear 96.

In an embodiment, a body portion 136 of the sensor plate 124 may comprise a substantially continuous surface. In another embodiment, as illustrated in FIG. 5, the sensor plate body portion 136 may have one or more apertures extending axially therethrough. The apertures may permit fluid, such as air and lubricant, to flow within the differential carrier 10. In an embodiment (not depicted), the sensor plate 124 may comprise a plurality of apertures having a small diameter, versus having fewer apertures with a relatively large diameter. The sensor plate 124, being coupled with the locking gear 96, moves axially with and rotates with the locking gear 96. Further, the sensor plate 124 may comprise a conductive material.

The actuator assembly housing 88 comprises an inboard surface 138, an outboard surface 140, and a radially outer surface 142. The radially outer surface 142 may be curvilinear and define a substantially constant outer diameter of the ring-shaped housing 88. The inboard and outboard surfaces 138, 140 define a substantially constant distance, or thickness, between them. The inboard and outboard surfaces 138, 140 are substantially parallel one another. The inboard and outboard surfaces 138, 140 may extend substantially transverse to an axis of rotation 144 of the differential case 24.

Similarly, the inboard and outboard surfaces 130, 132 of the sensor plate 124 may extend substantially transverse the axis of rotation 144 of the differential case 24. The inboard and outboard surfaces 130, 132 of the sensor plate 124 are substantially parallel to the inboard and outboard surfaces 138, 140 of the housing 88.

In an embodiment, a sensor 148 may be disposed on the inboard surface 138 of the housing 88. In another embodiment, the sensor 148 may be disposed in a recess in the inboard surface 138 of the housing 88. The sensor 148 may be located anywhere radially along the inboard surface 138. In one embodiment, the sensor 148 is located near a radially outward portion of the inboard surface 138. In an embodiment, more than one sensor 148 may be located at more than one radial location on the inboard surface 138. In another embodiment, the sensor 148 may comprise a ring disposed on the inboard surface 138.

Figure 6:
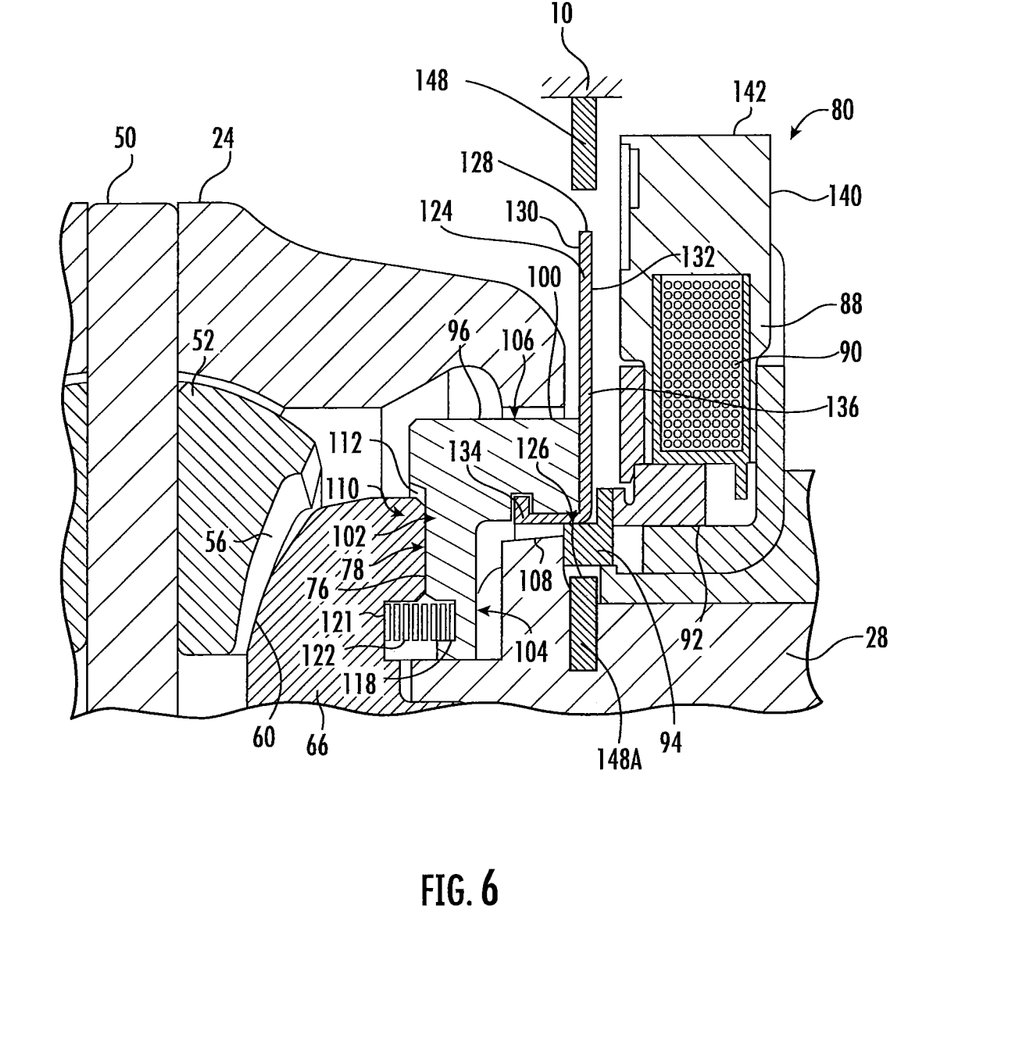
FIG. 6 illustrates a cross-section of a portion of a differential mechanism having a transverse sensor according to an embodiment of the presently disclosed subject matter.

In yet another embodiment, as illustrated in FIG. 6, the sensor 148 may be located transverse to the sensor plate 124. For example, the sensor 148 may be located radially outward from the sensor plate 124. In this embodiment, the sensor 148 is fixed a constant distance from the radially outer surface 128 of the sensor plate 124.

The transverse sensor 148 works essentially the same as described herein. In one embodiment, the transverse sensor 148 senses the percentage it is covered by the sensor plate radially outer surface 128 so that a microcontroller can determine the position of the sensor plate 124 based on the percentage of coverage.

In still another embodiment, as illustrated in FIG. 6, a first transverse sensor 148 may be located radially above the sensor plate 124 and a second transverse sensor 148A may be located radially below the sensor plate 124. By "above" and "below" is it meant that the first and second sensors are fixed radially opposite one another.

In another embodiment (not depicted), a first sensor 148 may be located axially adjacent the sensor plate inboard surface 130 and a second sensor 148 may be located axially adjacent the sensor plate outboard surface 132. Thus, the first and second sensors 148, 148 are located on either side of the sensor plate 124; the first sensor 148 faces the sensor plate inboard surface 130 and the second sensor 148 faces the sensor plate outboard surface 132. The second sensor 148 may be radially aligned with the first sensor. In other words, the first and second sensors 148, 148 may be located the same distances from the differential axis of rotation 144. In this embodiment, the data from the first and second sensors 148, 148 may be used by the controller microprocessor either in conjunction or separately. When used separately, the data can be compared to act as a double check on the sensor plate 124 position. When used together, the data can be used to detect any variation in the distance between the sensor plate 124 and the first and second sensors 148, 148.

In any of the above-described embodiments, the sensor 148 may be an inductive sensor comprising an inductive coil 149. The sensor inductive coil 149 may include, but is not limited to, a bobbin-wound length of wire, a printed circuit board (PCB) trace spiral, or a printed trace of metal (if the inboard surface is non-conductive). In an embodiment, the inductive coil 149 may be substantially planar and rigid. In another embodiment, the inductive coil 149 may be flexible, non-planar and/or curvilinear.

In embodiments where planar and rigid, the inductive coil 149 may be set in, or located on, a substrate. The substrate may be the housing 88, or a material attached to the housing 88 in which the sensor 148 is embedded.

In embodiments where flexible, non-planar and curvilinear, the inductive coil 149 may similarly be set in, or located on, a substrate. The substrate may be a flexible material that can be adapted to a curvilinear surface. In one embodiment, the substrate may be a flexible circuit board. Alternatively, the inductive coil 149, in whole or in part, may be curved or flexed so that it is curvilinear. The inductive coil 149 may then be located on a curvilinear shape, such as the differential case 24 or the differential carrier 10 or a structure connected to either.

Various types of sensors 148 may be used. A brief summary of some of the possible sensors 148 follows, but the device is not limited to just these sensors 148 or the operation described below.

In one embodiment, the sensor 148 may be a two-wire sensor. A voltage is provided to the sensor 148 (for example, approximately 4-9 volts), and a draw of current is fixed. The current may be such as either 7 milliamps or 14 milliamps depending on the state of the system. For example, one current may be associated with a locked condition of the differential mechanism and another current can be associated with an unlocked condition of the differential mechanism.

In another embodiment, the sensor 148 may be a three-wire sensor. This embodiment may output a fixed frequency signal around 250 Hz, but other frequencies may be used. The duty cycle of signal varies with the position of the sensor plate 124 or locking gear 96. The signal can be either continuous relative to the position of the sensor plate 124 or locking gear 96, or the signal can be fixed values based on specific positions of the sensor plate 124 or locking gear 96. For example, the signal may be 10% when the sensor plate 124 or locking gear 96 is closest to the sensor 148, and 90% when the sensor plate 124 or locking gear 96 is furthest from the sensor 148. In addition, percentage signals can be fixed for specific positions everywhere between the closest and furthest positions. In yet another embodiment of this sensor 148, the signal can be fixed at a particular amount in the closest position (unlocked) and a different particular amount in the furthest position (locked) with no other signals.

In another embodiment, a serial digital signal can be used. By way of example, the signal may be such as a UART-style or LIN-bus output with a predetermined baud rate (such as, by way of example 9600 baud).

The inductive coil 149 generates a high-frequency alternating magnetic field when a conductive material is nearby. The magnetic field causes eddy currents to form within the conductive material. The eddy currents create an opposite magnetic field to the field in the inductive coil 149. The amplitude of the inductive coil 149 eddy currents is proportional to the distance of the conductive material eddy currents. Thus, a relationship of the distance of the sensor 148 to the conductive material can be known based on the measured eddy current in the sensor 148. This relationship can be determined via a microcontroller (not depicted) coupled with the sensor 148. The microcontroller is preferably located on or within the actuator assembly housing 88.

In an embodiment, the conductive material may be the sensor plate 124. In another embodiment, the sensor 148 instead senses the location of the locking gear 96. It can be appreciated that the sensor 148 senses the exact position of the locking gear 96, whether sensor 148 senses the locking gear 96 directly, or the sensor plate 124. As can be appreciated from the foregoing, the location of the locking gear 96 and/or the sensor plate 124 can be known so that a reliable determination of whether the differential mechanism is in a locked or unlocked condition can also be reliably known.

FIGS. 1 and 2 illustrate the differential mechanism in an unlocked state. In an unlocked state, the locking gear 96 is not engaged with the second side gear 66. Additionally, the electromagnetic coil 90 is not sufficiently energized to actuate the armature 92. Further, the biasing member 122 biases the locking gear 96 to an axially outboard position.

Upon the detection of a condition wherein it may be desirable to lock the differential mechanism, electrical power is supplied to the electromagnetic coil 90 in an amount sufficient for the electromagnetic coil 90 to create a magnetic flux in the electrically conductive armature 92. There may be a variety of conditions that warrant locking the differential mechanism. These conditions may be monitored by one or more vehicle sensors (not depicted).

The magnetic flux in the armature 92 causes the armature 92 to move in an axially inboard direction. The flux in the armature 92 is sufficient that it moves the armature 92 against the biasing force of the biasing member 122. In other words, the axial inboard movement of the armature 92 axially moves the locking gear 96 in an inboard direction. As noted above, because the sensor plate 124 is coupled with the locking gear 96, the sensor plate 124 also moves in an axial inboard direction.

FIG. 3 illustrates the differential mechanism in the locked state. In the locked state, the armature 92, the locking gear 96, and the sensor plate 124, move in an axial inboard direction so that the second side gear locking teeth 76 and the locking gear teeth 112 engage with one another. When the second side gear locking teeth 76 and the locking gear teeth 112 are fully engaged the differential mechanism is locked. In the locked condition, the second side gear 66 is locked against rotation relative to the differential case 24. This prevents the second side gear 66 from rotating independently from the first side gear 64; instead, the first and second side gears 64, 66 can only rotate together. The locked state of the differential mechanism has the effect of dividing power equally to both the first and second side gears 64, 66, both axle half shafts, and both wheel ends.

When a locked differential mechanism is no longer required, the electrical power to the electromagnetic coil 90 is ended, or reduced. The termination or reduction in power to the electromagnetic coil 90 causes the biasing member 122 to urge the locking gear 96 in the axial outboard direction from the second side gear 66. This results in the locking teeth 76 of the second side gear 66 and the teeth 112 of the locking gear 96 to disengage. Once disengaged, the second side gear 66 can rotate with respect to the first side gear 64.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
   a differential case;
   a side gear having an inboard surface and an outboard surface disposed in said differential case, wherein said outboard surface defines a first plurality of locking teeth;
   a locking gear having an inboard surface and an outboard surface, wherein said inboard surface includes a second plurality of locking teeth selectively engaged with said first plurality of locking teeth;
   a biasing member disposed axially between said side gear and said locking gear;
   an electromagnetic coil disposed adjacent said locking gear;
   a first sensor for sensing a position of said locking gear, wherein said first sensor is an inductive sensor;
   a sensor plate coupled with said locking gear, wherein said first sensor senses a position of said sensor plate; and
   a second sensor disposed radially inward of said sensor plate, wherein said second sensor is disposed transverse to said sensor plate, and wherein said second sensor is an inductive sensor.

2. The axle assembly according to claim 1, further comprising:
   a first annular groove disposed in said outboard surface of said side gear; and
   a second annular groove disposed in said inboard surface of said locking gear, wherein said biasing member is at least partially disposed within said first and second annular grooves.

3. The axle assembly according to claim 1, further comprising:
   a plurality of apertures disposed in said differential case, wherein said locking gear includes a plurality legs disposed through said apertures.

4. The axle assembly according to claim 1, wherein:
   said differential case rotates relative to said electromagnetic coil.

5. The axle assembly according to claim 1, further comprising:
   a housing disposed about said electromagnetic coil, wherein said first sensor is disposed on said housing.

6. The axle assembly according to claim 1, wherein:
   said first sensor is disposed on said differential case.

7. The axle assembly according to claim 1, wherein:
   said first sensor includes a printed circuit board trace spiral.

8. The axle assembly according to claim 1, wherein:
   said sensor plate extends at least a radial length of said electromagnetic coil.

9. The axle assembly according to claim 1, wherein:
   said sensor plate is disposed axially between said differential case and said electromagnetic coil.

10. The axle assembly according to claim 1, further comprising:
    a housing disposed about said electromagnetic coil, wherein said first inductive sensor is disposed on said housing; and
    wherein said second sensor is disposed on said differential case.

11. The axle assembly according to claim 1, further comprising:
    a controller in electrical communication with said electromagnetic coil.

12. The axle assembly according to claim 1, wherein:
    said first sensor is disposed radially outward from said sensor plate for sensing a percentage said sensor plate covers said first sensor.

13. An axle assembly, comprising:
    a differential case;
    a side gear having an inboard surface and an outboard surface disposed in said differential case, wherein said outboard surface defines a first plurality of locking teeth;
    a locking gear having an inboard surface and an outboard surface, wherein said inboard surface includes a second plurality of locking teeth selectively engaged with said first plurality of locking teeth;
    a biasing member disposed axially between said side gear and said locking gear;
    an electromagnetic coil disposed adjacent said locking gear;
    a first sensor for sensing a position of said locking gear, wherein said first sensor is an inductive sensor;
    a sensor plate coupled with said locking gear, wherein said first sensor senses a position of said sensor plate; and
    a second sensor disposed radially inward of said sensor plate.

14. The axle assembly according to claim 13, wherein:
    said sensor plate extends at least a radial length of said electromagnetic coil.

15. The axle assembly according to claim 13, wherein:
    said sensor plate is disposed axially between said differential case and said electromagnetic coil.

16. The axle assembly according to claim 13, further comprising:
    a housing disposed about said electromagnetic coil, wherein said first sensor is disposed on said housing; and
    wherein said second sensor is disposed on said differential case.

17. The axle assembly according to claim 13, wherein:
    said first sensor is disposed radially outward from said sensor plate for sensing a percentage said sensor plate covers said first sensor.

18. An axle assembly, comprising:
    a differential case;
    a side gear disposed in said differential case, the side gear having a surface that defines a first plurality of locking teeth;
    a locking gear having a surface that includes a second plurality of locking teeth selectively engaged with said first plurality of locking teeth;
    an electromagnetic coil disposed adjacent said locking gear;
    a sensor plate coupled with said locking gear;
    a first sensor for sensing a position of said sensor plate; and
    a second sensor disposed radially inward of said sensor plate.

19. The axle assembly according to claim 18, further comprising:
   a housing disposed about said electromagnetic coil, wherein said first sensor is disposed on said housing; and
   wherein said second sensor is disposed on said differential case.

20. The axle assembly according to claim 18, wherein:
   said first sensor is disposed radially outward from said sensor plate for sensing a percentage said sensor plate covers said first sensor.

* * * * *